US010608327B1

(12) United States Patent
Ho

(10) Patent No.: US 10,608,327 B1
(45) Date of Patent: Mar. 31, 2020

(54) ANTENNA STRUCTURE AND WIRELESS COMMUNICATION DEVICE EMPLOYING SAME

(71) Applicant: HON HAI PRECISION INDUSTRY CO., LTD., New Taipei (TW)

(72) Inventor: Chao-Wei Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/438,638

(22) Filed: Jun. 12, 2019

(30) Foreign Application Priority Data

Apr. 24, 2019 (CN) .......................... 2019 1 0335529

(51) Int. Cl.
*H01Q 1/00* (2006.01)
*H01Q 1/24* (2006.01)
*H01Q 21/30* (2006.01)
*H01Q 21/00* (2006.01)
*H04B 1/00* (2006.01)
*H04B 7/0404* (2017.01)
*H04B 7/0413* (2017.01)

(52) U.S. Cl.
CPC .......... *H01Q 1/243* (2013.01); *H01Q 21/0025* (2013.01); *H01Q 21/30* (2013.01); *H04B 1/006* (2013.01); *H04B 1/0067* (2013.01); *H04B 7/0404* (2013.01); *H04B 7/0413* (2013.01)

(58) Field of Classification Search
None
See application file for complete search history.

(56) References Cited

U.S. PATENT DOCUMENTS

| 8,428,670 | B2 * | 4/2013 | Mukai | H01Q 1/273 455/569.1 |
| 8,830,131 | B1 * | 9/2014 | Doane | H01P 5/222 343/722 |
| 9,923,607 | B2 * | 3/2018 | Yoshino | H01Q 1/2275 |
| 10,205,237 | B2 * | 2/2019 | Tsukuda | H01Q 7/00 |
| 2001/0010662 | A1 * | 8/2001 | Saitou | H01Q 1/08 368/281 |
| 2008/0122711 | A1 * | 5/2008 | Kimura | H01Q 1/273 343/745 |
| 2008/0158083 | A1 * | 7/2008 | Apostolos | H01Q 19/30 343/791 |
| 2009/0262970 | A1 * | 10/2009 | Shin | H04R 1/1091 381/384 |
| 2017/0207535 | A1 * | 7/2017 | Tsukuda | H01Q 7/00 |

* cited by examiner

*Primary Examiner* — Tuan A Tran
(74) *Attorney, Agent, or Firm* — ScienBiziP, P.C.

(57) ABSTRACT

An antenna structure requiring less installation space but providing 2G-5G wireless capabilities includes a first antenna, a second antenna, and a ferrite beads module. The ferrite beads module connects between the first antenna and the second antenna. When the antenna structure operates at a first radiation frequency band, a connection between first antenna and second antenna is open, thus the second antenna operates independently. For a second radiation frequency band, the first antenna and the second antenna are shorted out and cooperatively transmit and receive wireless signals, frequencies of the first radiation frequency band being greater than frequencies of the second radiation frequency band. A wireless communication device employing the antenna structure is also provided.

15 Claims, 3 Drawing Sheets

ANTENNA STRUCTURE AND WIRELESS COMMUNICATION DEVICE EMPLOYING SAME

FIELD

The subject matter herein generally relates to an antenna structure able to operate in multiple frequency bands and a wireless communication device employing the antenna structure.

BACKGROUND

Antennas allow wireless communication devices to receive and transmit wireless signals at different frequencies. The 5th-Generation (5G) standard may be faster and provide a greater capacity, and a Multiple-Input Multiple-Output (MIMO) structure is frequently used in multiple antenna designs. However, designing a 2G, 3G, 4G, or 5G antenna in the wireless communication device is difficult because of the limited space.

BRIEF DESCRIPTION OF THE DRAWINGS

Implementations of the present disclosure will now be described, by way of embodiments, with reference to the attached figures.

DETAILED DESCRIPTION

Figure 1:
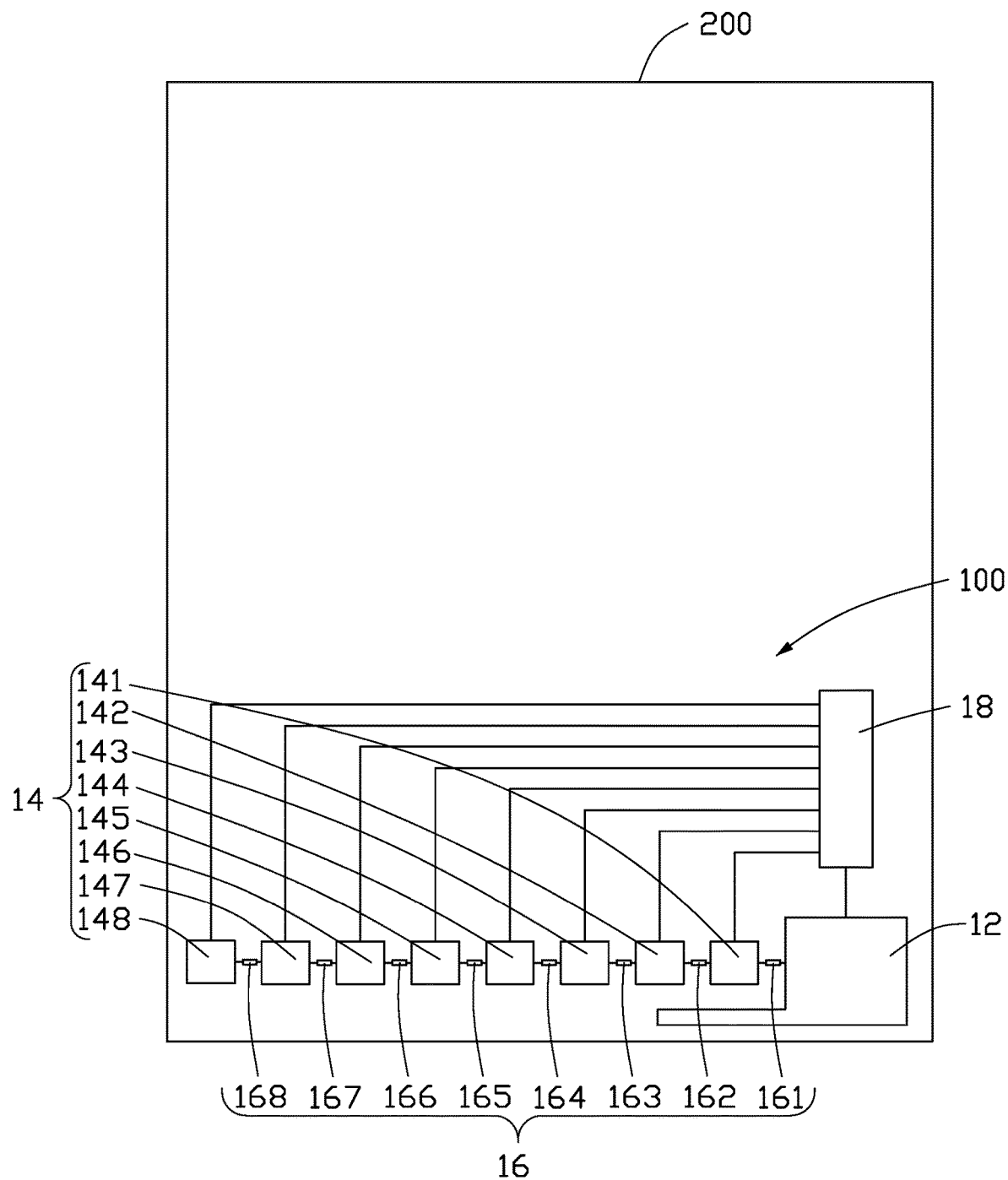
FIG. 1 is a planar view of an embodiment of a wireless communication device employing an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device employing same.

FIG. 1 illustrates a first embodiment of a wireless communication device 200 employing an antenna structure 100. The wireless communication device 200 can be, for example, a mobile phone or a personal digital assistant. The antenna structure 100 can receive and transmit wireless signals for communication.

The antenna structure 100 includes a first antenna 12, a second antenna 14, a ferrite beads module 16, and a processor 18. In at least one embodiment, the antenna structure 100 can be arranged on a circuit board (not shown), the circuit board providing a power source and ground connection for the antenna structure 100. In other embodiments, the antenna structure 100 can be arranged on other carriers, such as a housing of the wireless communication device 200. The antenna structure 100 can receive electric current and be grounded by other ways, such as by being grounded through a metal housing of the wireless communication device 200.

The first antenna 12 is a 2G/3G/4G antenna for transmitting and receiving wireless signals in 2G, 3G, and 4G frequency bands. In at least one embodiment, the 2G/3G/4G antenna can be in multiple structures according to different design requirements of the wireless communication device 200.

The second antenna 14 is a 5G antenna array including a plurality of 5G antennas connected in series for transmitting and receiving wireless signals in 5G frequency bands. In at least one embodiment, a structure and an arrangement of the 5G antennas can be in multiple forms according to different design requirements of the wireless communication device 200. In at least one embodiment, the 5G antenna array includes eight 5G antennas, 141-148.

Figure 2:
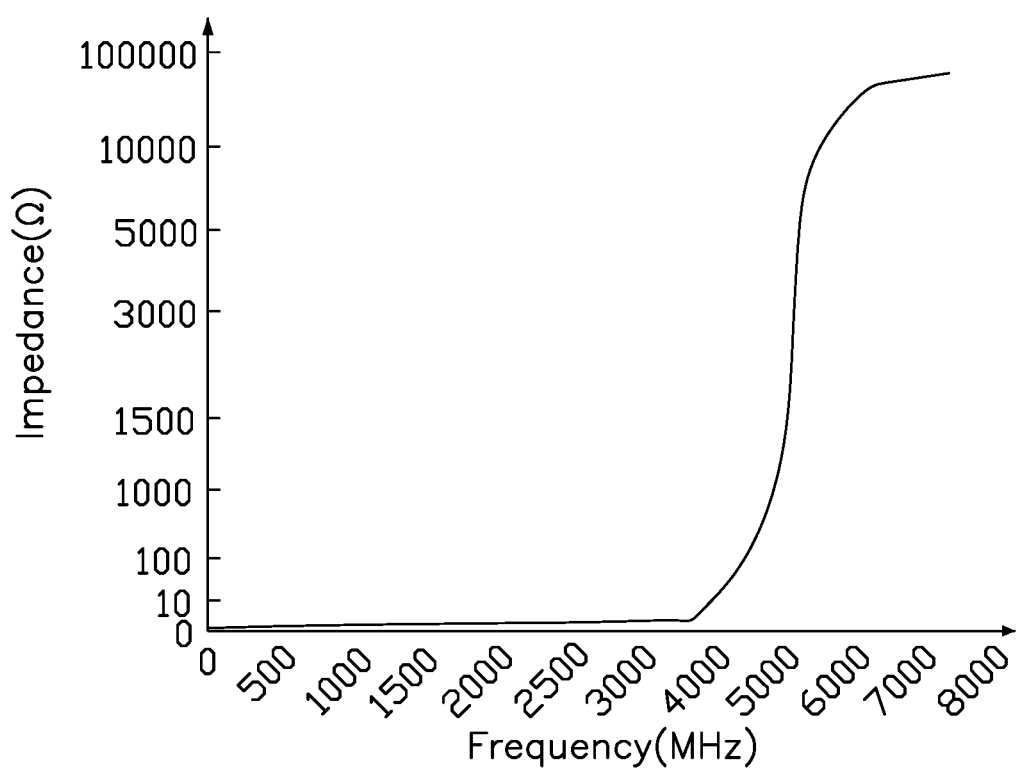
FIG. 2 shows impedance characteristics over frequency of ferrite beads of the antenna structure of FIG. 1.

The ferrite beads module 16 can be chip ferrite beads including a plurality of ferrite beads for electrical connections between the 5G antennas and for connecting the first antenna 12 and the second antenna 14. In at least one embodiment, the ferrite beads module 16 includes eight ferrite beads 161-168. There is one ferrite bead 162-168 connected between every two 5G antennas 141-148, and there is one ferrite bead 161 connected between the 5G antenna 141 and the first antenna 12. Thus, the first antenna 12 and the plurality of 5G antennas 141-148 are electrically connected in series through the plurality of ferrite beads 161-168. Referring to FIG. 2, the plurality of ferrite beads 161-168 have high impedance characteristics at frequencies above 3000 MHz, the impedance characteristics are low at frequencies below 3000 MHz.

The processor 18 is electrically connected to the first antenna 12 and the plurality of 5G antennas 141-148 of the second antenna 14 through a plurality of signal wires. The processor 18 is configured to provide electrical current and any necessary matching for the first antenna 12 and the second antenna 14 to make the first antenna 12 and the second antenna 14 operate at multiple frequency bands.

In at least one embodiment, the first antenna 12 and the plurality of 5G antennas 141-148 of the second antenna 14 include ends for grounding, for instance, grounding through the circuit board or the housing of the wireless communication device 200.

When the processor 18 feeds in electrical current into the first antenna 12 and the plurality of 5G antennas 141-148 of the second antenna 14, the electrical current flows through the first antenna 12 and the plurality of 5G antennas 141-148 of the second antenna 14 to activate a first operating mode and a second operating mode to generate radiation signals in a first radiation frequency band and in a second radiation frequency band. In at least one embodiment, the first operating mode includes a 5G mode, this first radiation frequency band includes a 5G frequency band of about 5000-6000 MHz. The second operating mode includes a low frequency mode, a middle frequency mode, and a high frequency mode, the second radiation frequency band covering these modes includes a low frequency band of about 699-960 MHz, a middle frequency band of about 1710-2170 MHz, and a high frequency band of about 2300-2690 MHz. Therefore, the signals of the second radiation frequency band cover the 2G, 3G, and 4G frequency bands.

Figure 3:
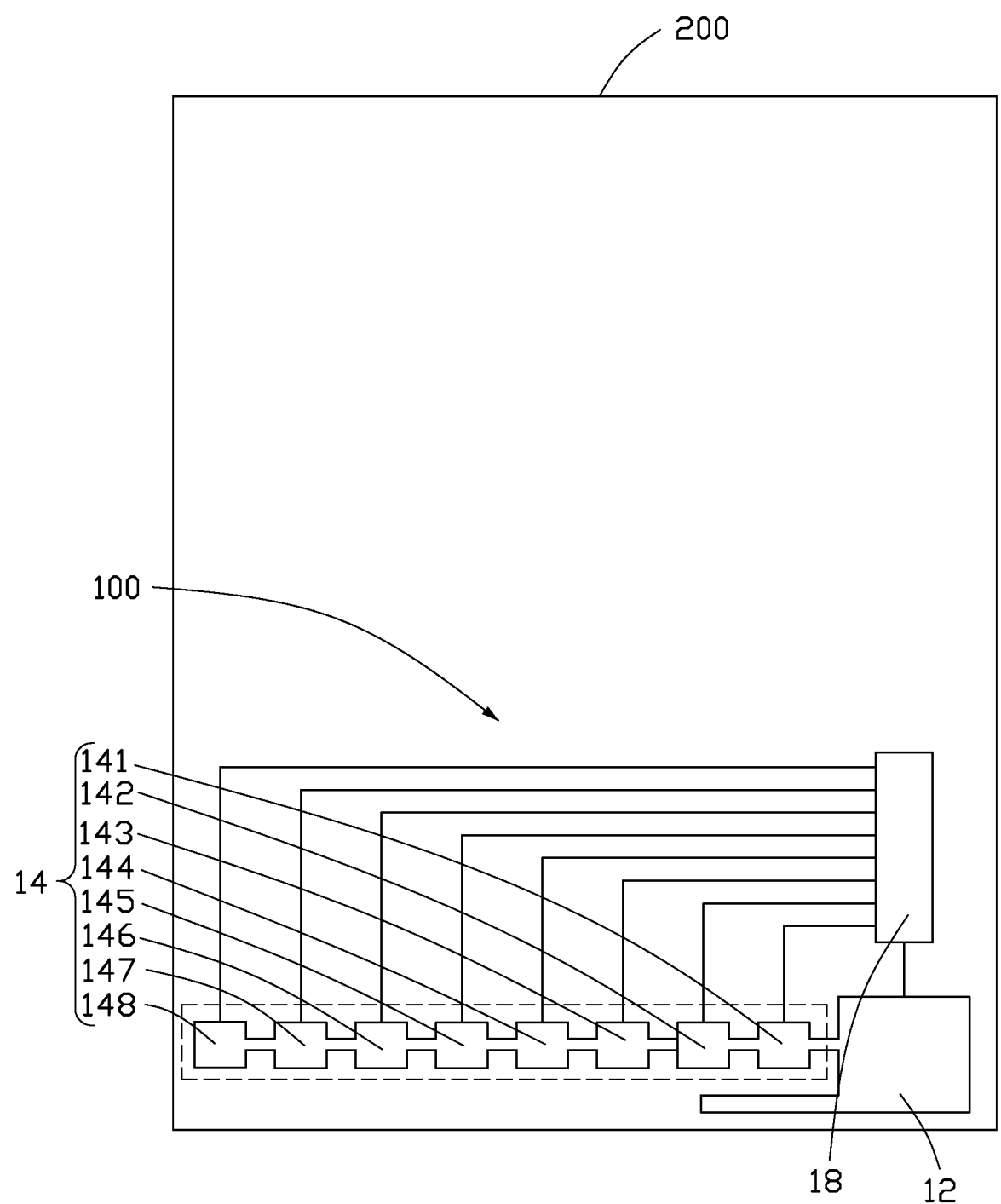
FIG. 3 is a planar view of an antenna structure in another form.

When the antenna structure 100 operates at the first radiation frequency band, that is a frequency band above 3000 MHz, the plurality of ferrite beads 161-168 show high impedance characteristics. Every one of the plurality of 5G antennas 141-148 and the first antenna 12 are open, and each of the plurality of 5G antennas 141-148 is independent and forms a 5G MIMO antenna for simultaneously transmitting and receiving wireless signals. Therefore, a transmitting speed of the antenna structure 100 is improved at least eight times. When the antenna structure 100 operates at the second radiation frequency band, that is a frequency band below 3000 MHz, the plurality of ferrite beads 161-168 function with low impedance characteristics, every one of the plurality of 5G antennas 141-148 and the first antenna 12 are shorted, thus every one of the 5G antennas 141-148 and the first antenna 12 are effectively connected (shown in FIG. 3) for cooperatively transmitting and receiving wireless signals. Therefore, a length of a current path of the first antenna 12 is increased and a design space for the 2G, 3G, 4G can be decreased.

The antenna structure 100 includes the plurality of ferrite beads 161-168 connecting between the 5G antennas 141-148 of the second antenna 14 and the first antenna 12 in series. Because of different impedance characteristics of the ferrite beads 161-168 in different frequency bands, the 5G antennas 141-148 are independent of each other in the 5G frequency band for simultaneously transmitting and receiving wireless signals. This improves communication efficiency. In the 2G, 3G, and 4G frequency bands the 5G antennas 141-148 and the first antenna 12 are connected for cooperatively transmitting and receiving wireless signals and this allows a decreased design space for the extra 2G, 3G, and 4G antenna. The antenna structure 100 can transmit and receive wireless signals in all of 2G, 3G, 4G, and 5G frequency bands so as to increase usability.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure applied in a wireless communication device, the antenna structure comprising:
a first antenna;
a second antenna; and
a ferrite beads module;
wherein the first antenna and the second antenna are electrically connected through the ferrite beads module; and
wherein when the antenna structure operates at a first radiation frequency band, a connection between the first antenna and the second antenna is open, the second antenna independently transmits and receives wireless signals; when the antenna structure operates at a second radiation frequency band, the first antenna and the second antenna are shorted and cooperatively transmit and receive wireless signals; frequencies of the first radiation frequency band are greater than frequencies of the second radiation frequency band;
wherein the second antenna is a 5G antenna array comprising a plurality of 5G antennas in series for transmitting and receiving wireless signals in 5G frequency bands.

2. The antenna structure of claim 1, wherein the first antenna is a 2G/3G/4G antenna for transmitting and receiving wireless signals in 2G, 3G, 4G frequency bands.

3. The antenna structure of claim 1, wherein the ferrite beads module comprises a plurality of ferrite beads, the number of the plurality of ferrite beads equals to the number of the plurality of 5G antennas, the plurality of ferrite beads electrically connects all of the plurality of 5G antennas and the first antenna.

4. The antenna structure of claim 3, wherein the second antenna comprises eight 5G antennas, the ferrite beads module comprises eight ferrite beads, one of the ferrite beads connects between every two of the 5G antennas, and one of the ferrite beads connects between one of the 5G antennas and the first antenna.

5. The antenna structure of claim 3, wherein the antenna structure further comprises a processor, the processor is electrically connected to the first antenna and the plurality of 5G antennas of the second antenna through a plurality of signal wires, the processor is configured to provide electrical current and matching for the first antenna and the second antenna.

6. The antenna structure of claim 5, wherein the first radiation frequency band is a frequency band above 3000 MHz, the second radiation frequency band is a frequency band below 3000 MHz.

7. The antenna structure of claim 6, wherein the plurality of ferrite beads have high impedance characteristics in the first radiation frequency band, connections between the plurality of 5G antennas and a connection between one of the plurality of 5G antennas and the first antenna are open, each of the plurality of 5G antennas are independent to each other and forms a 5G Multiple-Input Multiple-Output (MIMO) antenna for simultaneously transmitting and receiving wireless signals; the plurality of ferrite beads have low impedance characteristics in the second radiation frequency band, connections between the plurality of 5G antennas and the connection between one of the plurality of 5G antennas and the first antenna are shorted, the plurality of 5G antennas and the first antenna are connected in series for cooperatively transmitting and receiving wireless signals.

8. A wireless communication device comprising:
an antenna structure comprising:
a first antenna;
a second antenna; and
a ferrite beads module;
wherein the first antenna and the second antenna are electrically connected through the ferrite beads module; and wherein when the antenna structure operates at a first radiation frequency band, a connection between the first antenna and the second antenna is open, the second antenna independently transmits and receives wireless signals; when the antenna structure operates at a second radiation frequency band, the first antenna and the second antenna are shorted and cooperatively transmit and receive wireless signals; frequencies of the first radiation frequency band are greater than frequencies of the second radiation frequency band;

wherein the second antenna is a 5G antenna array comprising a plurality of 5G antennas in series for transmitting and receiving wireless signals in 5G frequency bands.

9. The wireless communication device of claim 8, wherein the first antenna is a 2G/3G/4G antenna for transmitting and receiving wireless signals in 2G, 3G, 4G frequency bands.

10. The wireless communication device of claim 8, wherein the ferrite beads module comprises a plurality of ferrite beads, the number of the plurality of ferrite beads equals to the number of the plurality of 5G antennas, the plurality of ferrite beads electrically connects all of the plurality of 5G antennas and the first antenna.

11. The wireless communication device of claim 10, wherein the second antenna comprises eight 5G antennas, the ferrite beads module comprises eight ferrite beads, one of the ferrite beads connects between every two of the 5G antennas, and one of the ferrite beads connects between one of the 5G antennas and the first antenna.

12. The wireless communication device of claim 10, wherein the antenna structure further comprises a processor, the processor is electrically connected to the first antenna and the plurality of 5G antennas of the second antenna through a plurality of signal wires, the processor is configured to provide electrical current and matching for the first antenna and the second antenna.

13. The wireless communication device of claim 12, wherein the first radiation frequency band is a frequency band above 3000 MHz, the second radiation frequency band is a frequency band below 3000 MHz.

14. The wireless communication device of claim 13, wherein the plurality of ferrite beads have high impedance characteristic in the first radiation frequency band, connections between the plurality of 5G antennas and a connection between one of the plurality of 5G antennas and the first antenna are open, each of the plurality of 5G antennas are independent to each other and forms a 5G Multiple-Input Multiple-Output (MIMO) antenna for simultaneously transmitting and receiving wireless signals; the plurality of ferrite beads have low impedance characteristic in the second radiation frequency band, connections between the plurality of 5G antennas and the connection between one of the plurality of 5G antennas and the first antenna are shorted, the plurality of 5G antennas and the first antenna are connected in series for cooperatively transmitting and receiving wireless signals.

15. The wireless communication device of claim 8, further comprising a circuit board, wherein the circuit board provides feed in power source and ground for the antenna structure.

* * * * *